April 22, 1924.

W. H. THORPE

BATTERY COVER

Filed Oct. 30, 1922

1,491,326

Inventor:

William H. Thorpe,

By Arthur Middleton

Attorney.

Patented Apr. 22, 1924.

1,491,326

UNITED STATES PATENT OFFICE.

WILLIAM H. THORPE, OF MOUNT VERNON, NEW YORK.

BATTERY COVER.

Application filed October 30, 1922. Serial No. 597,960.

*To all whom it may concern:*

Be it known that I, WILLIAM H. THORPE, a citizen of the United States, residing at Mount Vernon, N. Y., have invented certain new and useful Improvements in Battery Covers, of which the following is a specification.

My present invention relates to electric batteries and its primary object is the provision of means in such a battery which will prevent the electrolyte from creeping from the cells to the surrounding parts of the battery, thus eliminating the usual corrosion and deterioration.

Another and important object consists in the provision of means whereby a battery of this type may be readily dismantled by the ordinary user or with the minimum amount of difficulty, for cleaning or replacement of parts.

Still another object is the advantage derived from the present particular combination, construction and arrangements of parts.

To this end my invention includes a battery jar of any desired construction and a cover therefor. It will be found convenient to provide the jar with a flange at its upper edge extending outwardly to which the top is to be secured. It may be found desirable to provide the jar flange with a recess which may be filled with soft rubber, vaseline, or the like, to assist in preventing the electrolyte from leaving the cells along the line of the joint between the jar and top.

I provide bolts to secure the top to the jar of a construction found to be most satisfactory. Such a bolt may consist of a threaded shank with an inverted mushroom shaped head and provided with a cup shaped threaded nut adapted to engage the shank, the head and nut being of relatively soft material. By filling the concave portions of head and nut with petroleum jelly, vaseline, or other plastic acid resisting material, creepage of the electrolyte up the shank is prevented. The vaseline also protects the metal shank from corrosion. If it is not desired to have the bolts penetrate both jar flange and cover, the head of the bolt may be embedded in the jar or cover in the process of manufacture, the shank projecting through the other member to receive the cup or nut.

I have illustrated in the drawings several embodiments of my invention, but it is understood that I do not consider these forms as the only ones capable of carrying out the invention, but these are merely shown for the purpose of illustrating forms which have proved satisfactory.

Figure 1:
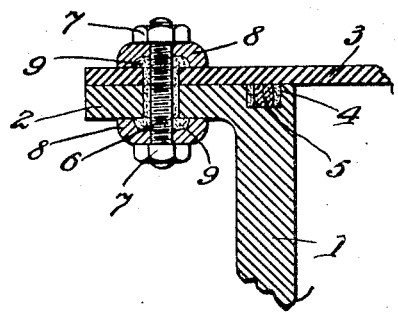
Fig. 1 is a sectional elevation of a part of a battery jar and cover with one form of bolt used to secure the parts together.

In these drawings I have shown a battery jar of hard rubber or the like at 1 provided with an outwardly projecting flange 2 having perforations adapted to receive bolts. A cover 3 preferably but not necessarily of the same material as the jar is adapted to close the mouth of the jar and extend outwardly toward the edge of the flange 2. Similar and coinciding bolt holes are provided in the cover 3 as in the flange 2. The jar 1 may have a peripheral groove 4 adapted to receive a soft rubber member 5 of a height slightly greater than the depth of the groove, so that the member 5 will contact under pressure with both jar and cover to prevent creepage of the electrolyte through this joint.

In the form shown in Fig. 1, the bolt used to secure the cover to the jar includes a brass screw threaded shank 6 with nuts 7 of similar material at each end thereof. Between a nut and the cover, and a nut and the jar, I provide a cup 8 of lead or the like. This member is adapted to have its concave portion filled with vaseline 9 or the like before securing in place. If the perforation in flange and cover through which shank 6 passes is made sufficiently large, a filling of vaseline may be placed therein and surrounding the shank, thus protecting the shank from corrosion. It will thus be seen that if the electrolyte escapes past the groove 4 it will be prevented from creeping up or down the shank of the bolt by the vaseline. Even should this occur, the fact that the lead cups 8 are pressed tightly against and even embedded in the cover and flange will prevent the electrolyte from reaching and corroding the outside of the bolt member.

Figure 2:
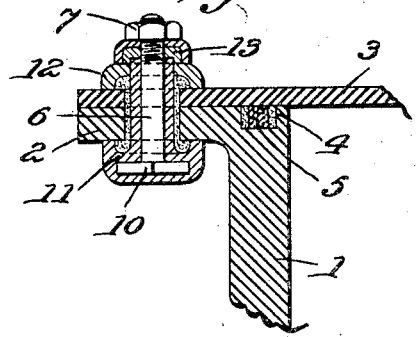
Figs. 2, 3 and 4 are views similar to Fig. 1 showing modified bolts.

In Fig. 2 the brass shank 6 is provided with a head 10 embedded in a lead covering, the lower portion of which takes the form of an inverted cup 11. An additional cup member 12 is provided on top of the cover and surrounding the shank 6 which serves the same function as the cup 11. The shank 6 extends above its lead covering and is provided with a brass nut 7 threaded to shank 6 which engages a lead covered brass cup 13 which in turn bears against the cup 12. Between the various cups and their adjacent members vaseline is placed for the purpose of preventing creeping of the electrolyte past these parts and the subsequent corrosion of these members.

Figure 3:
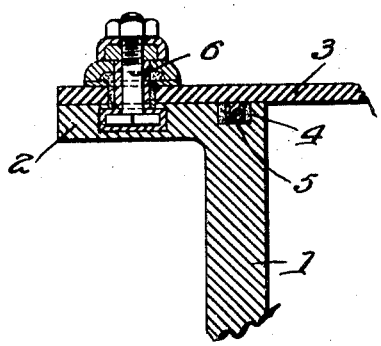

Fig. 3 illustrates the form in which the lead covered head of the brass shank 6 is embedded in the jar 1. This form is especially desirable where it is not possible to use a nut or cup on each end of the shank, such as in between cells where the bolt would naturally fall within the walls of the jar 1.

Figure 4:
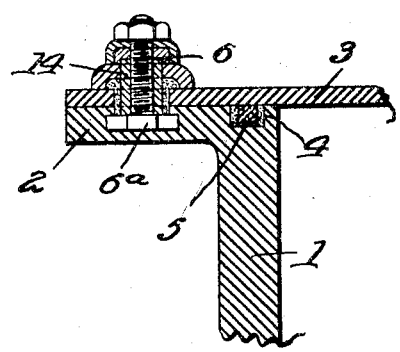

The form of bolt in Fig. 4 shows the brass shank 6 provided with a head $6^a$ embedded in the jar and also provided with a lead sleeve 14 screwed over the shank. This may be necessary where the vulcanizing temperature of the hard rubber battery jar is sufficiently high to melt a lead or lead covered shank. With this construction the lead parts are applied after vulcanization.

A lead cup is made use of because of the relative softness of this material which allows itself to adapt itself to any irregularities in the member with which it is to make contact. Any other material which will also have these qualities and is acid resisting will obviously be satisfactory. A brass shank is used as that material is cheap and has sufficient strength and may be readily covered with lead. However, I do not limit myself to this material.

It will be evident that the plastic acid resisting material contained within the peripheral groove of the jar serves not only to prevent creepage of the electrolyte, but also acts as a preservative for the soft rubber, which would otherwise rapidly deteriorate under action of the acid.

Throughout the specification and claims where I have mentioned plastic acid resisting material, it is to be understood that this may take the form of either a paste or a liquid.

It may be found desirable to interpose a rubber or compound washer between the bolt cups and the battery member adjacent thereto, in order to insure sealing of the plastic material within the cups. As a battery of this type often becomes heated, it is desirable to prevent escape of the consequently heated sealing material.

I claim:

1. In combination, a battery including a jar and a cover therefor, a securing device penetrating one of said members, said device having a shank, a cup surrounding said shank, means to force contact between said cup and one of said battery members and acid-resisting plastic material within said cup and contacting with one of said battery members.

2. The device of claim 1, said device having a head embedded in one of said battery members.

3. The device of claim 1, said device having a head embedded in one of said battery members, said head being covered with an acid resisting material extending without the battery member.

4. In combination, a battery including a jar and cover therefor, an aperture in one of said members, means securing jar and cover together passing through said aperture, and acid-resisting plastic material maintained in said aperture around said securing means.

5. In combination, a battery including a jar and cover therefor, a bolt device for removably securing the cover and jar together, means for maintaining an acid-resisting medium around said bolt at the joint between said jar and cover.

6. The device of claim 5 in which said means comprise a cup on said bolt, a soft gasket encircling said bolt, nut means for clamping said gasket between said cup and said cover, and acid-resisting plastic material confined within said cup to prevent corrosive action on the soft gasket by any electrolyte from the battery.

7. The device of claim 5 with means for preventing creepage of electrolyte from the battery to said bolt comprising a groove in the top of said jar, a soft gasket in said groove, and acid-resisting moldable material in said groove around said gasket.

In testimony whereof I have affixed my signature to this specification.

WILLIAM H. THORPE.